(12) United States Patent
Nakayasu (10) Patent No.: US 8,382,155 B2
(45) Date of Patent: Feb. 26, 2013

(54) GAS GENERATOR

(75) Inventor: Masayuki Nakayasu, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 131 days.

(21) Appl. No.: 13/074,044

(22) Filed: Mar. 29, 2011

(65) Prior Publication Data

US 2011/0239891 A1     Oct. 6, 2011

Related U.S. Application Data

(60) Provisional application No. 61/319,119, filed on Mar. 30, 2010.

(30) Foreign Application Priority Data

Mar. 30, 2010 (JP) .................................. 2010-76604

(51) Int. Cl.
*B60R 21/263* (2011.01)
*B60R 21/264* (2006.01)

(52) U.S. Cl. ......................... 280/741; 280/737; 102/530

(58) Field of Classification Search .................. 280/741, 280/736, 737, 740; 102/530, 531
See application file for complete search history.

(56) References Cited

U.S. PATENT DOCUMENTS

| 6,032,979 A | 3/2000 | Mossi et al. |
| 7,651,128 B2 * | 1/2010 | Ohji et al. ..................... 280/741 |
| 2007/0001439 A1 * | 1/2007 | Matsuda et al. .............. 280/741 |
| 2007/0057496 A1 | 3/2007 | Matsuda et al. |
| 2007/0085314 A1 * | 4/2007 | Matsuda et al. .............. 280/740 |
| 2007/0257477 A1 * | 11/2007 | Ohji et al. ..................... 280/741 |
| 2010/0071580 A1 | 3/2010 | Nakayasu et al. |

FOREIGN PATENT DOCUMENTS

| JP | 2002-503584 A | 2/2002 |
| WO | WO 99/42339 A1 | 8/1999 |

OTHER PUBLICATIONS

International Search Report issued in International Patent Application No. PCT/JP2011/057509 on Jul. 26, 2011.

* cited by examiner

*Primary Examiner* — Joseph Rocca
*Assistant Examiner* — Keith Frisby
(74) *Attorney, Agent, or Firm* — Birch, Stewart, Kolasch & Birch, LLP (57) ABSTRACT

A gas generator includes, a housing having a defining a first combustion chamber, an ignition chamber cup, defining an ignition chamber, and a combustion chamber cup, defining a second combustion chamber, being aligned at a distance in a radial direction, a first communication hole communicating the ignition chamber with the first combustion chamber being provided in a circumferential wall portion of the ignition chamber cup, a second communication hole communicating the second combustion chamber with the first combustion chamber being provided in a circumferential wall portion of the combustion chamber cup, a cup-shaped cover member covering the combustion chamber cup and closing the second communication hole, a disk-shaped retainer retaining a gas generating agent, being provided with a first opening for fitting the ignition chamber cup and a second opening for fitting the combustion chamber cup, an annular gap being formed between the second opening and the cover member.

4 Claims, 5 Drawing Sheets

GAS GENERATOR

This nonprovisional application claims priority under 35 U.S.C. §119 (a) to Patent Application No. 2010-76604 filed in Japan on 30 Mar. 2010 and 35 U.S.C. §119 (e) to U.S. Provisional Application No. 61/319,119 filed on 30 Mar. 2010, both of which are incorporated by reference.

BACKGROUND OF THE INVENTION

1. Field of the Invention

The present invention relates to a gas generator for use in a restraining device of a vehicle and the like.

2. Description of Related Art

In a gas generator that uses a solid gas generating agent, a gas generating agent of various shapes such as granular, a pellet form and a disk shape is used. The surface area of a gas generating agent increases when the agent is powdered due to external vibration or shock, which affects the output of the gas generator. Thus, fixing means for the gas generating agent is needed in order to block movement of the gas generating agent in the combustion chamber.

In JP-A No. 2002-503584, an igniter cup 56 and a generant cup 84 are aligned in the radial direction in a housing construction 12. A second gas generant material 86 and an initiating device 90 are accommodated in a second chamber 82 in the generant cup 84. A plurality of gas exit orifices 104 are formed on a sidewall 100 of the generant cup 84, and an outer side wall of the cylindrical sidewall 100 including the gas exit orifices 104 is covered with a cylindrical pressure sensitive insulator barrier material 106.

Figure 1:
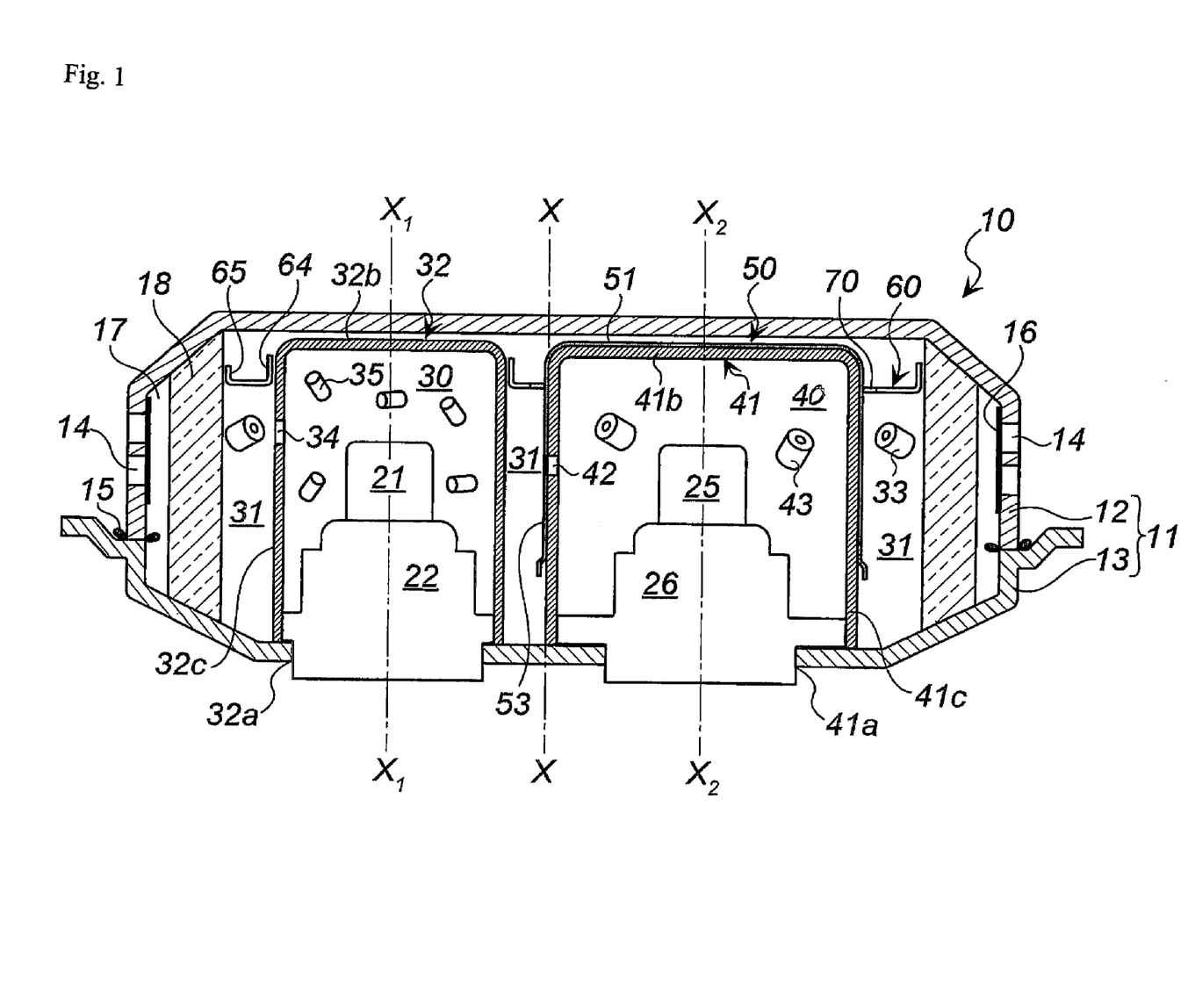
FIG. 1 shows an axial sectional view of a gas generator according to the present invention.

As shown in FIG. 1, a first gas generant material 36 in a first chamber 34 is retained by a retainer 50, and the retainer 50 further presses a part of the pressure sensitive insulator barrier material 106. Since the other portions of the pressure sensitive insulator barrier material 106 are sandwiched with the igniter cup 56 and the generant cup 84, it is impossible to expand and deform in the direction of the igniter cup 56, and it is difficult for the gas exit orifices 104 of the generant cup 84 which face the igniter cup 56 to open. In addition, since the retainer 50 abuts against an upper surface of a filter 42, an charging amount into the first chamber 34 is restricted, so in some cases, the function of retaining the gas generant cannot be sufficiently yielded depending on an amount of the first gas generant 36.

SUMMARY OF THE INVENTION

The present invention provides a gas generator including:

a housing (11) formed by a diffuser shell (12) having a gas discharge port (14) and a closure shell (13), a first combustion chamber (31) defined in the housing (11) and a first gas generating agent (33) charged in the first combustion chamber, in the first combustion chamber (31), an ignition chamber cup (32) defining an ignition chamber (30) and a second combustion chamber cup (41) defining a second combustion chamber (40) being aligned at a distance in the radial direction, a first igniter (21) being accommodated in the ignition chamber (30) inside the ignition chamber cup (32), a first communication hole (34), for causing communication with the first combustion chamber (31) at the time of actuation, being provided in a circumferential wall portion (32c) of the ignition chamber cup (32), a second igniter (25) and a second gas generating agent (43) being accommodated in the second combustion chamber (40) inside the second combustion chamber cup (41), a second communication hole (42), for causing communication with the first combustion chamber (31) at the time of activation, being provided in a circumferential wall portion (41c) of the second combustion chamber cup (41), a cup-shaped cover member (50) covering the second combustion chamber cup (41) and closing the second communication hole (42), a disk-shaped retainer (60), for retaining the first gas generating agent (33), being disposed in the housing (11) and provided with a first opening (62) and a second opening (63), the disk-shaped retainer (60) being mounted by fitting the ignition chamber cup (32) through the first opening (62) and putting the second combustion chamber cup (41) through the second opening (63), and an annular gap (70) being formed between the second opening (63) and the cover member (50) covering the second combustion chamber cup (41).

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 6, in (a), shows a perspective view of the retainer according to another embodiment, and FIG. 6, in (b), shows a partial cross sectional view of (a) of FIG. 6.

DETAILED DESCRIPTION OF THE INVENTION

The present invention provides a gas generator including a retainer for retaining a gas generating agent in a first combustion chamber, and a cover member for closing a communication hole for causing the second combustion chamber and the first combustion chamber to be in communication. And the present invention provides a gas generator which can be operated smoothly because, during actuation, the retainer and the cover member do not interfere with each other and the first combustion chamber and the second combustion chamber are mutually associated.

The present invention provides the following preferably embodiments (2), (3) and (4):

(2) a gas generator according to the above shown invention, wherein the cover member has a cut (55) formed on an opening (52) thereof, and the cut is formed on a surface that is opposite to a surface where the cover member abuts against the second communication hole, that is, the cut being formed on a surface of the cover member being opposite side to the second communication hole;

(3) a gas generator according to the above shown invention, wherein the disk-shaped retainer includes a first annular wall (64) formed at a periphery of the first opening, and an inner circumferential surface of the first annular wall is fixed by being in press-contact with an outer surface of the circumferential wall portion of the ignition chamber cup; and (4) a gas generator according to the above shown invention, wherein the disk-shaped retainer includes the first annular wall formed at a periphery of the first opening, and an inner circumferential surface of the first annular wall is fixed by being in press-contact with an outer surface of the circumferential wall portion of the ignition chamber cup, and the first annular wall is formed to extend to a diffuser shell side and so that an inner diameter thereof becomes smaller toward the diffuser shell side, and further includes notches (170) formed in a circumferential direction at intervals.

The gas generator of the present invention includes the retainer for retaining and blocking movement of the first gas generating agent charged in the first combustion chamber, and the cover member for covering the second communication hole formed on the second combustion chamber (the second combustion chamber cup).

Further in the gas generator of the present invention, during activation, when the second gas generating agent in the second combustion chamber is burnt, the cover member, enclosing the second combustion chamber (the second combustion chamber cup) from the outside, deforms outwardly in the axial direction, and thereby the second communication hole which has been closed by the cover member is opened, and as a result, causing the second combustion chamber and the first combustion chamber in communication with each other.

Moreover, the deformation of the cover member during the operation of the gas generator is achieved smoothly because of:

(I) a gap being formed between the ignition chamber cup and the second combustion chamber cup; and (II) a gap being formed between the cover member covering the second combustion chamber cup and the second opening of the retainer.

In order to further facilitate the deformation of the above cover member in the gas generator of the present invention, a cut may be formed at the opening of the cover member. By using such a cover member, since the cover member cleaves at the cut, the second communication hole is opened and the gas discharge path is easily released. Thus, the discharge of combustion gas from the second combustion chamber can be performed smoothly.

Preferably, the retainer used in the present invention is of a structure where it can be press-fitted to the ignition chamber cup. With such a press-fitting structure, the assembling operation can be simplified since the retainer can be fixed by simply being fitted to the igniter cup.

Preferably, the cover member, used in the present invention, has an enlarged-diameter portion in which the opening thereof expands outward, in order to be easily fitted to the second combustion chamber cup.

With the gas generator of the present invention, movement of the first gas generating agent in the first combustion chamber is blocked before actuation due to function of the retainer.

Further, during actuation, the second gas generating agent in the second combustion chamber is not ignited and burnt due to function of the cover member even when combustion gas is generated in the first combustion chamber. And since the retainer and the cover member mutually interact without interference, the second communication hole is opened when the second gas generating agent in the second combustion chamber is ignited and burnt, and combustion gas can be smoothly discharged from the second combustion chamber.

Moreover, the height of mounting the retainer can be adjusted based on the amount of the gas generating agent charged in the first combustion chamber.

Embodiment of the Invention

Figure 2:
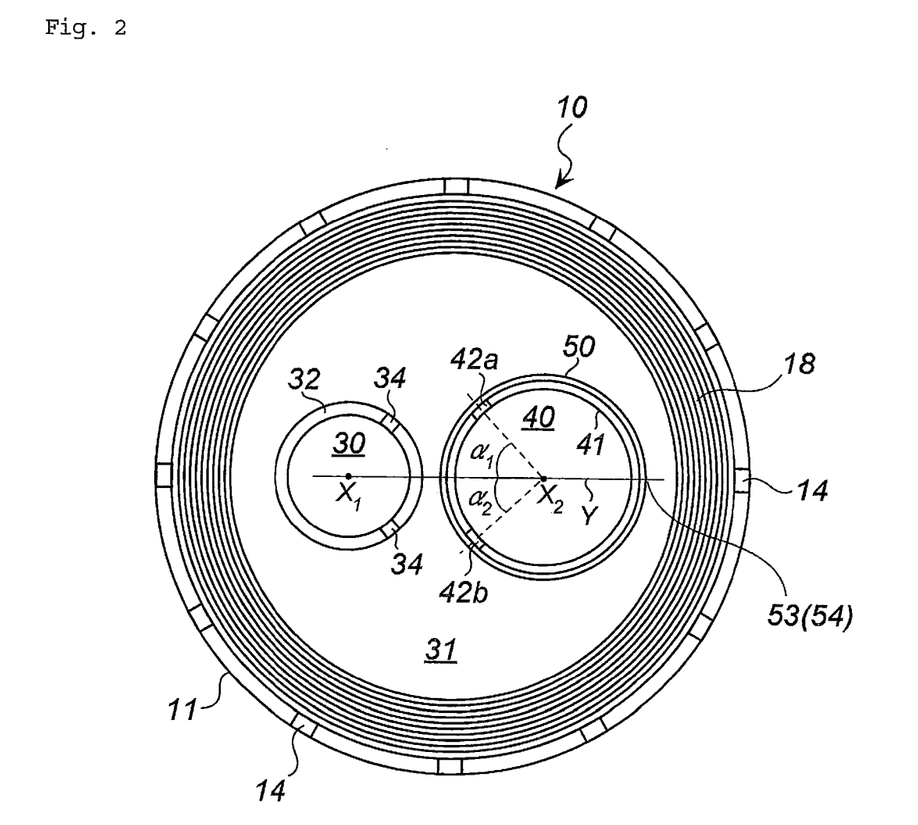
FIG. 2 shows a radial cross-sectional view of FIG. 1.

The gas generator of the present invention will be explained with reference to the drawings. FIG. 1 is a cross-sectional view of the gas generator using the retainer of the present invention, and FIG. 2 is a cross-sectional view in the radial direction of the gas generator in FIG. 1 (some members are not shown to facilitate understanding).

In a gas generator 10 of FIG. 1, a diffuser shell 12 and a closure shell 13 are welded at a bonding part 15 to form a housing 11 as an outer container.

A plurality of gas discharge ports 14 are provided on the circumferential surface of the diffuser shell 12, and the gas discharge ports 14 are closed from the inside with a seal tape 16 made of aluminum or the like.

Two holes are provided at the bottom surface of the closure shell 13, and each of two holes are eccentrically formed with respect to the central axis X of the housing 11 outwardly in the radial direction.

One of the above holes is mounted with a first igniter 21 fixed to a first igniter collar 22, and the other hole is mounted with a second igniter 25 fixed to a second igniter collar 26.

A cylindrical filter 18 is disposed inside the housing 11, and a cylindrical gap 17 is provided between the outer circumferential surface of the filter 18, and the gas discharge port 14 and the seal tape 16.

A first combustion chamber 31 is defined inside the filter 18, and a first gas generating agent 33 is charged therein.

Further in the first combustion chamber 31, an ignition chamber cup 32 and a second combustion chamber cup 41 are arranged adjacently at a distance in the radial direction.

The ignition chamber cup 32 includes an opening 32a, a top plate 32b, and a circumferential wall portion 32c, and the cup 32 is fitted to the first igniter collar 22 from the opening 32a side so as to cover the first igniter 21. The ignition chamber cup 32 is disposed so that the central axis X1 thereof is eccentric with respect to the central axis X of the housing 11 outwardly in the radial direction.

The circumferential wall portion 32c of the ignition chamber cup 32 has a constant outer diameter from the top plate 32b to the opening 32a, and a plurality of first communication holes 34 are formed therein. The plurality of first communication holes 34 are closed with a seal member (not shown) prior to actuation of the gas generator 10, and are opened after actuation of the gas generator 10 and causes the first combustion chamber 31 and an ignition chamber 30 to be in communication with each other.

As shown in FIG. 2, the first communication holes 34 are formed in the circumferential wall portion 32c at a position where a large amount of the first gas generating agent 33 exists (a position where the distance from the cylindrical filter 18 is large).

The inside of the ignition chamber cup 32 becomes the ignition chamber 30, and a known enhancer or a gas generating agent is filled, as the transfer charge 35, in the space excluding the first igniter 21 of the ignition chamber 30.

The second combustion chamber cup 41 includes an opening 41a, a top plate 41b, and a circumferential wall portion 41c, and the cup 41 is fitted to the second igniter collar 26 from the opening 41a side so as to cover the second igniter 25. The second combustion chamber cup 41 is disposed so that the central axis X2 is eccentric with respect to the central axis X of the housing 11 outwardly in the radial direction.

The circumferential wall portion 41c of the second combustion chamber cup 41 has a constant outer diameter from the top plate 41b to the opening 41a, and two second communication holes 42 are formed therein.

As shown in FIG. 2, the two second communication holes 42 (42a, 42b) are formed, in the circumferential wall portion 41c at a position where a large amount of the first gas generating agent 33 exists (a position where the distance from the cylindrical filter 18 is large). Note that, since the second communication holes 42 can be formed at different height positions, more than two (for example, a total of four to ten) holes may be formed as a whole.

The two second communication holes 42 (42a, 42b) are formed at symmetrical positions relative to the line Y connecting the central axis X1 of the ignition chamber cup 32 and the central axis X2 of the second combustion chamber cup 41. Note that the line Y also coincides with the line connecting the intermediate point of the second communication holes 42a, 42b, and the central axis X2.

The angle ($\alpha 1$) formed by the line Y and the line connecting the central axis X2 and the center of the second communication hole 42a, and the angle ($\alpha 2$) formed by the line Y and the line connecting the central axis X2 and the center of the second communication hole 42b are the same, and they can be set to be within the range of $\alpha 1 = \alpha 2 = 15$ to $45°$.

The inside of the second combustion chamber cup 41 is a second combustion chamber 40, and a known second gas generating agent 43 is charged therein.

A cup-shaped cover member 50 covers the second combustion chamber cup 41 from the top plate 41b side.

Figure 3:
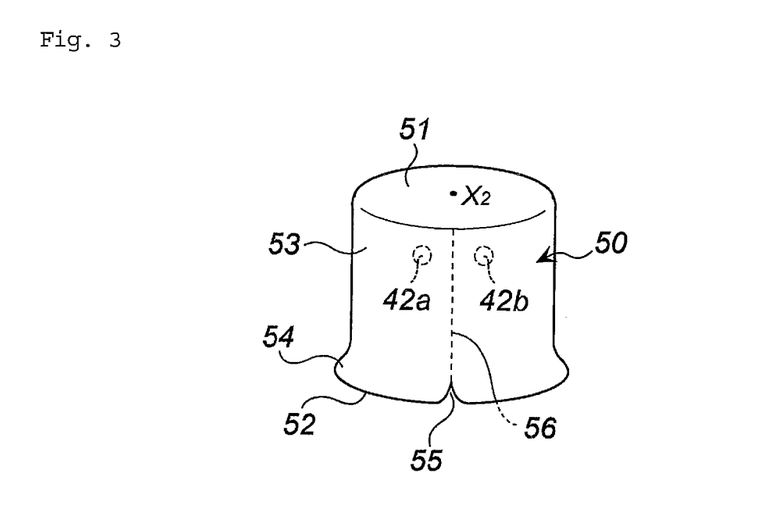
FIG. 3 shows a perspective view of the cover member used in FIG. 1.

The cup-shaped cover member 50 includes, as shown in FIG. 1 and FIG. 3 (a perspective view of the cover member 50), a bottom portion 51, an opening 52, and a circumferential surface portion 53, and the top plate 41b of the second combustion chamber cup 41 and the bottom portion 51 of the cover member 50 abut against each other. The cover member 50 is made of iron having a thickness of 0.4 mm, and a part of the bottom portion 51, including the center part thereof, may be opened.

The second communication holes 42 (42a, 42b) of the second combustion chamber cup 41 are covered with the cover member 50 from the outside, and the circumferential wall portion 41c of the second combustion chamber cup 41 and the circumferential surface portion 53 of the cover member 50 are in close contact with each other.

The cover member 50 has an enlarged-diameter portion 54 with an enlarged outer diameter formed in the circumferential surface portion 53 in the vicinity of the opening 52, and a triangular cut 55 is further formed in the enlarged-diameter portion 54.

It will suffice as long as the cut 55 is formed in the enlarged-diameter portion 54 on the surface that is opposite to the surface of the cover member 50 abutting against the second communication holes 42a, 42b, but as shown in FIG. 3, it may be formed in the enlarged-diameter portion 54 at a position that is farthest from both second communication holes 42a, 42b (a position where the line Y and the cover member 50 intersect one another in FIG. 2). The circumferential surface portion 53 may also be formed with a score (a fragile part) 56 extending as an extension of the apex of the cut 55.

Note that, when a cut 55 is formed in the cover member 50, in order to prevent the cover member 50, covering the second combustion chamber cup 41, from rotating and changing the position of the cut 55, the foregoing rotation may be prevented by causing the bottom portion 51 of the cover member 50 to be in press-contact with the ceiling surface of the housing 11, or by forming convex and concave portions on the top plate 41b of the second combustion chamber cup 41.

In the first combustion chamber 31, a retainer 60 for preventing the movement of the first gas generating agent 35 is disposed.

Figure 4:
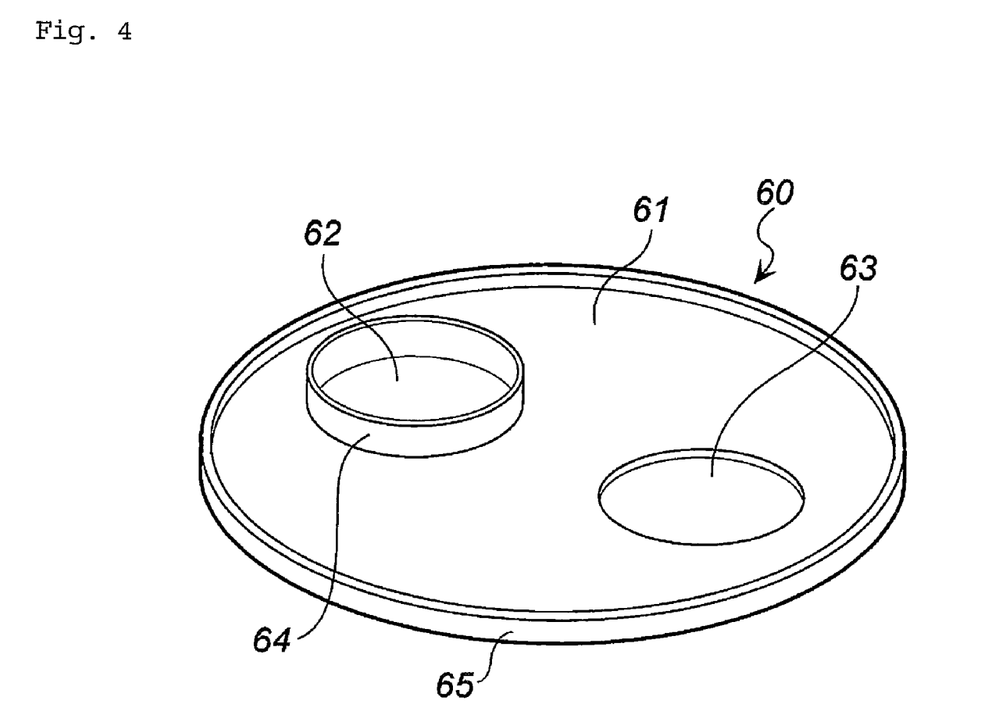
FIG. 4 shows a perspective view of the retainer used in FIG. 1.

The retainer 60 includes, as shown in FIG. 4, a base portion 61, a first opening 62 for inserting the ignition chamber cup 32, and a second opening 63 for inserting the second combustion chamber cup 41.

Moreover, a first annular wall 64 protruding toward the diffuser shell 12 of FIG. 1 is formed on the circumferential edge of the first opening 62, and a second annular wall 65 protruding toward the diffuser shell 12 of FIG. 1 is formed on the circumferential edge of the base portion 61. The height of the first annular wall 64 is higher than the second annular wall 65.

The ignition chamber cup 32 is fitted into the first opening 62 of the retainer 60, and the second combustion chamber cup 41 (a cover member 50) is put through the second opening 63 of the retainer 60.

Since the inner diameter of the first annular wall 64 of the first opening 62 is adjusted to be slightly smaller than the outer diameter of the circumferential wall portion 32c of the ignition chamber cup 32, the first annular wall 64 is in press-contact with the circumferential wall portion 32c (abuts in a pressed state). As a result of causing the first annular wall 64 and the circumferential wall portion 32c to be in a press-contact state, the overall retainer 60 is fixed in the first combustion chamber 31.

The inner diameter of the second opening 63 is adjusted to be larger than the outer diameter of the cover member 50 covering the second combustion chamber cup 41, and an annular gap 70 is formed between the inner circumferential edge of the second opening 63 and the circumferential surface portion 53 of the cover member 50.

The second annular wall 65 of the retainer 60 is arranged so as to be spaced from the inner circumferential surface of the filter 18 with a gap of a size that the first gas generating agent 33 is not allowed to pass through. The second annular wall 65 may abut against the inner circumferential surface of the filter 18.

Next, operation of the gas generator 10 shown in FIG. 1 will be explained. Note that, with the first igniter 21 and the second igniter 25, there are cases where only the first igniter 21 is actuated, where the first igniter 21 is actuated first and the second igniter 25 is actuated later, and where the first igniter 21 and the second igniter 25 are simultaneously actuated, according to a degree of the shock at the time of collision. The following is a case where the first igniter 21 is actuated first and the second igniter 25 is actuated later.

Before actuation, movement of the first gas generating agent 33 inside the first combustion chamber 31 is blocked due to function of the retainer 60.

When an automobile collides and is subject to shock, the first igniter 21 is actuated and ignited upon receiving an actuation signal from a control unit, and ignites and combusts the transfer charge 35 inside the ignition chamber 30.

The combustion product (high temperature gas, flames and the like) passes through the first communication hole 34 and enters the first combustion chamber 31, ignite and combust the first gas generating agent 33, and thereby generates combustion gas.

Figure 5:
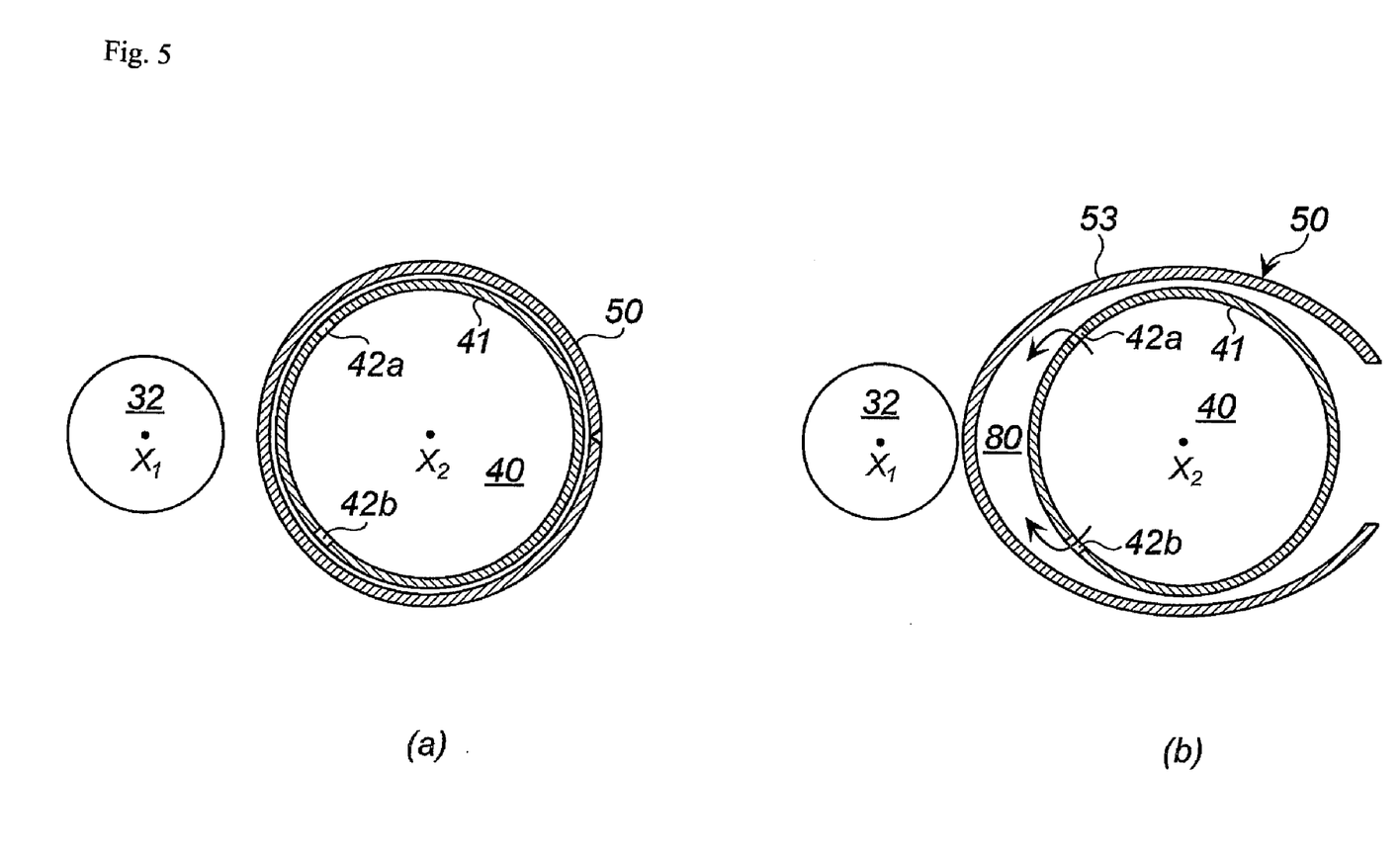
FIG. 5, in both (a) and (b), is a diagram explaining the operation of the gas generator of FIG. 1.

Here, the second communication hole 42 formed on the second combustion chamber cup 41 is closed by the cover member 50, and the second gas generating agent 43 inside the second combustion chamber 40 is not ignited and combusted by the above combustion gas (in the state shown in (a) of FIG. 5).

The combustion gas generated from the first gas generating agent 33 in the first combustion chamber 31 passes through the filter 18 and is filtered and cooled, and thereafter breaks the seal tape 16 and is discharged from the gas discharge port 14.

The second igniter 25 is actuated and ignited later, behind the first igniter 21, and the second gas generating agent 43 in the second combustion chamber 40 is ignited and combusted, and combustion gas is thereby generated.

The circumferential surface portion 53 of the cover member 50 closing the second communication holes 42 (42a, 42b) is pushed toward the outward radial direction by this combustion gas and deformed, and since tensile stress works on the cut 55 shown in FIG. 3, the circumferential surface portion 53 can be easily cleaved therefrom (in the state shown in (b) of FIG. 5).

Here, since an annular gap 70 is formed between the second opening 63 of the retainer 60 and the cover member 50 (the circumferential surface portion 53), and a gap is also formed between the ignition chamber cup 32 and the second combustion chamber cup 41, the cleavage caused by the deformation of the cover member 50 is not inhibited.

Consequently, a space 80 (refer to (b) of FIG. 5) serving as the gas passage is formed between the second combustion chamber cup 41 and the cover member 50. The gas passes through the gap 80 and flows toward the closure shell 13 (in the downward direction in FIG. 1), and then reaches the first combustion chamber 31. Accordingly, the combustion gas is cooled while flowing in contact with the second combustion chamber cup 41 and the cover member 50, and meantime the combustion residue contained in the gas is trapped, so that the amount of combustion residue is reduced until the gas reaches the filter 18.

Since the retainer 60 is mounted by press-fitting the first annular wall 64 to the circumferential wall portion 32c of the igniter cup 32, the press-fitting depth (the height position in the axial direction) can be adjusted based on the charged amount of the first gas generating agent 33. Thus, a gas generator with a broad output performance can be provided with a single component (a single retainer 60).

Note that the retainer 60 of the present invention can be used in a gas generator including a filter 18 for partitioning the first combustion chamber 31 as shown in FIG. 1. Further the retainer 60 of the present invention can also be used in a gas generator in which the combustion chamber is defined by a cylindrical ring member in substitute for the filter 18.

Figure 6:
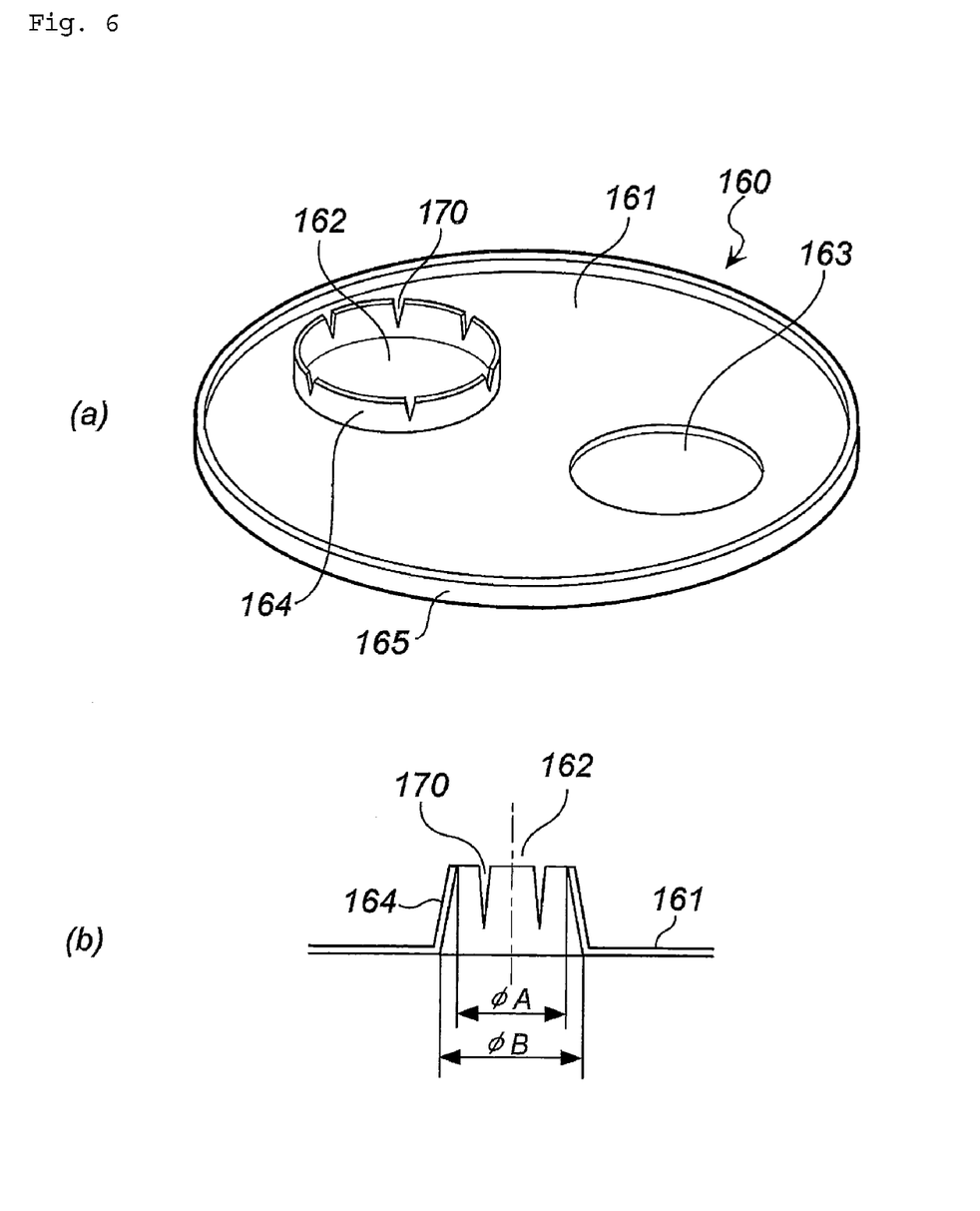

A retainer 160 according to another embodiment will be explained with reference to FIG. 6. FIG. 6, in (a), is a perspective view, and FIG. 6, in (b), is a partial cross-sectional view.

The retainer 160 is different in part from the retainer 60 shown in FIG. 4, but is used as shown in FIG. 1, which is the same as the retainer 60 shown in FIG. 4.

The retainer 160 includes, as shown in (a) of FIG. 6, a base portion 161, a first opening 162 for inserting the ignition chamber cup 32, and a second opening 163 for inserting the second combustion chamber cup 41.

Further, a first annular wall 164 protruding toward the diffuser shell 12 of FIG. 1 is formed on the circumferential edge of the first opening 162, and a second annular wall 165 protruding toward the diffuser shell 12 of FIG. 1 is formed on the circumferential edge of the base part 161. The height of the first annular wall 164 is higher than the second annular wall 165.

The inner diameter of the first annular wall 164 becomes smaller toward the diffuser shell 12 (toward the opposite side of the base 161) ($\phi A < \phi B$) as shown in (b) of FIG. 6.

Unlike the retainer 60 of FIG. 4, a plurality of V-shaped notches 170 are formed at equal intervals on the first annular wall 164 in the circumferential direction. The width of the notches 170 become greater toward the diffuser shell 12 (toward the opposite side of the base 161).

By changing the inner diameter of the first annular wall 164 and providing the notches 170 as described above, the first annular wall 164 has elasticity, and the insertion of the ignition chamber cup 32 to the first opening 162 is thereby facilitated.

An embodiment of assembling the gas generator 10 shown in FIG. 1 will be explained.

The first igniter 21 fixed to the first igniter collar 22 and the second igniter 25 fixed to the second igniter collar are fixed to the two holes of the closure shell 13 respectively.

Then, the ignition chamber cup 32 (charged with the transfer charge 35) is fitted and fixed to the first igniter collar 22, and the second combustion chamber cup 41 (charged with the second gas generating agent 43) is fitted and fixed to the second igniter collar 26.

Next, the cover member 50 is put to cover the second combustion chamber cup 41. Note that, in the previous process, the second combustion chamber cup 41 covered with the cover member 50 may be fitted to the second igniter collar 26.

Then, after disposing the cylindrical filter 18, the first gas generating agent 33 is charged.

Next, the retainer 60 is mounted by press-fitting the first opening 62 to the ignition chamber cup 32 and putting the second combustion chamber cup 41 through the second opening 63. Here, by press-fitting the first annular wall 64 to the ignition chamber cup 32, the first annular wall 64 and the ignition chamber cup 32 are caused to be in a press-contact state. The retainer 60 can be fixed with only the above process, and the position of the filter 18 is decided with the second annular wall 65 of the retainer 60.

Subsequently, the diffuser shell 12 is placed and the bonding part 15 is welded for integration.

With the gas generator 10 of the present invention, the retainer 60 can be mounted simply by press-fitting the first annular wall 64 to the ignition chamber cup 32. Thus, it is no longer necessary to adjust the mounting state of the retainer and other members, and the operation can thereby be simplified enormously.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator comprising:
   a housing formed by a diffuser shell having a gas discharge port and a closure shell, a first combustion chamber defined in the housing and a first gas generating agent charged in the first combustion chamber,
   in the first combustion chamber, an ignition chamber cup defining an ignition chamber and a second combustion chamber cup defining a second combustion chamber being aligned at a distance in the radial direction,
   a first igniter being accommodated in the ignition chamber inside the ignition chamber cup, a first communication hole, for causing communication with the first combustion chamber at the time of actuation, being provided in a circumferential wall portion of the ignition chamber cup,
   a second igniter and a second gas generating agent being accommodated in the second combustion chamber inside the second combustion chamber cup, a second communication hole, for causing communication with the first combustion chamber at the time of activation, being provided in a circumferential wall portion of the second combustion chamber cup, a cup-shaped cover member covering the second combustion chamber cup and closing the second communication hole, a disk-shaped retainer, for retaining the first gas generating agent, being disposed in the housing and provided with a first opening and a second opening, the disk-shaped retainer being mounted by fitting the ignition chamber cup through the first opening and putting the second combustion chamber cup through the second opening, and an annular gap being formed between the second opening and the cover member covering the second combustion chamber cup.

2. A gas generator according to claim 1, wherein the cover member has a cut formed on an opening thereof, and the cut is formed on a surface that is opposite to a surface where the cover member abuts against the second communication hole.

3. A gas generator according to claim 1, wherein the disk-shaped retainer includes a first annular wall formed at a periphery of the first opening, and an inner circumferential surface of the first annular wall is fixed by being in press-contact with an outer surface of the circumferential wall portion of the ignition chamber cup.

4. A gas generator according to claim 1, wherein the disk-shaped retainer includes the first annular wall formed at a periphery of the first opening, and an inner circumferential surface of the first annular wall is fixed by being in press-contact with an outer surface of the circumferential wall portion of the ignition chamber cup, and the first annular wall is formed to extend to a diffuser shell side and so that an inner diameter thereof becomes smaller toward the diffuser shell side, and further includes notches (170) formed in a circumferential direction at intervals.

* * * * *